United States Patent
Keski-Hynnila et al.

(10) Patent No.: US 7,631,552 B2
(45) Date of Patent: Dec. 15, 2009

(54) METHOD OF VERIFYING COMPONENT FUNCTIONALITY ON EGR AND AIR SYSTEMS

(75) Inventors: Donald E. Keski-Hynnila, Canton, MI (US); Jeffery S. Hawkins, Farmington Hills, MI (US); Harald Wedler, Neuhausen (DE); Reinhard Pfundt, Ansbach (DE); Frank S. Groer, West Bloomfield, MI (US); Mark A. Zurawski, Northville, MI (US); Dennis J. Grace, West Bloomfield, MI (US); Heather A. Staley, Garden City, MI (US); Jimmie L. Priest, Jr., Ypsilanti, MI (US); Min Sun, Troy, MI (US); Jason T. Barton, Canton, MI (US); Zhiping Han, La Salle (CA); Martin Fritz, Rudersberg (DE)

(73) Assignee: Detroit Diesel Corporation, Detroit, MI (US)

( * ) Notice: Subject to any disclaimer, the term of this patent is extended or adjusted under 35 U.S.C. 154(b) by 142 days.

(21) Appl. No.: 11/957,702

(22) Filed: Dec. 17, 2007

(65) Prior Publication Data
US 2008/0148827 A1 Jun. 26, 2008

Related U.S. Application Data

(60) Provisional application No. 60/876,664, filed on Dec. 22, 2006.

(51) Int. Cl.
*G01M 15/04* (2006.01)
(52) U.S. Cl. .................................. 73/114.74
(58) Field of Classification Search ............. 73/114.69, 73/114.74, 114.75, 114.76
See application file for complete search history.

(56) References Cited

U.S. PATENT DOCUMENTS 6,850,834 B1 2/2005 Yu et al.

(Continued)

*Primary Examiner*—Eric S McCall
(74) *Attorney, Agent, or Firm*—Bill C. Panagos; Rader, Fishman & Grauer, PLLC

(57) ABSTRACT

In one aspect, the present invention is directed to a method for operating an electronically controlled internal combustion engine in a vehicle to perform at least one rationality check on at least one sensor to detect impending sensor failure and verify component functionality. The engine is equipped with an engine control system (ECS) having a memory and in electronic communication with various sensors. The sensors transmit data signals to the ECS indicative of associated engine and vehicle component functionality. The method comprises determining a measured operating condition of a first component from sensor data signals indicative of first component functionality, determining a measured operating condition of a second component from sensor data signals indicative of second component functionality, comparing the measured condition of the first component to the measured operating condition of the second component to determine whether sensor readings from the first component are indicative of a component operating within a normal range but indicative of impending sensor or component failure, logging an indication of an impending sensor or component failure as a fault in MPU memory if it occurs for a predetermined period of time and for more than a predetermined number of times and drive cycles, and activating a warning alert to an operator and initiating remedial actions responsive to the indication of impending component or sensor failure. The data logged includes time of fault, type of fault, number of occurrences of the fault, number of drive cycles where the fault occurred and distance traveled with the fault logged.

58 Claims, 3 Drawing Sheetse

U.S. PATENT DOCUMENTS

2008/0162024 A1* 7/2008 Groer et al. .................. 701/114
2008/0162026 A1* 7/2008 Groer et al. .................. 701/115

* cited by examiner

METHOD OF VERIFYING COMPONENT FUNCTIONALITY ON EGR AND AIR SYSTEMS

CROSS-REFERENCE TO RELATED APPLICATIONS

The present application claims priority of provisional patent application 60/876,664 field Dec. 22, 2006 entitled "Method of Verifying Component Functionality on EGR & Air Systems".

TECHNICAL FIELD OF THE INVENTION

Current engine controller software provides circuit diagnostics (failed high, short to battery, short to ground) for all input sensors. Sensors not exhibiting hard circuit failures may adversely affect emissions as a result of in-range failures of sensors. Recent legislation requires that these in-range failures of emission related inputs be detected and the engine operated accordingly so that the impending failure is noted and attended to by service personnel. The present invention is directed to a method to implement rationality checks for detecting and managing in-range failures of emissions related inputs. The rationality checks are intended to identify components that are still operating within their normal range but are not longer accurate due to sensor drift or sensor deterioration. The rationality checks can be used to verify emissions related component functionality consistent with emissions requirement.

SUMMARY OF THE INVENTION

In one aspect, the present invention includes a method for operating an electronically controlled internal combustion engine in a vehicle to perform at least one rationality check on at least one sensor to detect impending sensor failure and verify component functionality. The engine is usually equipped with a electronic control unit (ECU) having a memory. The engine control system (ECS) may consist of multiple ECUs. For example, it may be a two controller system comprised of a Motor Control Module (MCM) and a Common Powertrain Controller (CPC) interface in data link communication with each other and the sensors. The MCM is in electronic communication with various sensors on the engine and it receives additional vehicle component and other powertrain information from CPC via a data link. Other powertrain/vehicle sensors are in electronic communication either with CPC or other vehicle electronic control units (ECUs) and their respective sensor information is transmitted to MCM indicating the associated engine and vehicle component functionality. The engine is equipped with a coolant system, an EGR valve in fluid communication with a manifold having an inlet and an outlet and a variable or fixed geometry turbocharger, which may be equipped with a wastegate. The vehicle is also equipped with speed sensors and a transmission, which may have its own ECU, is in data communication with CPC. CPC is in data communication with the MCM In one aspect, the method may comprise determining limits of a range of operation of sensor or component functionality;

determining engine/vehicle/powertrain operating conditions in which the specified component information from sensor data signals indicative of first and second component (or as otherwise specified for special cases) functionality shall be evaluated;

determining the measured values of a first and second component (or as otherwise specified for special cases) from sensor data signals indicative of first and second component functionality;

comparing said measured condition of said first component to said measured operating condition of said second component to determine whether sensor readings from said first and second components are indicative of a component operating within a normal range or indicative of a component or system failure based on an irrational measured values for some of the parametric information that has been evaluated;

logging an indication of an impending sensor or component failure as a fault in MCM memory if it occurs for a predetermined period of time; and initiating a warning alert to an operator and taking remedial actions responsive to said indication of impending component or sensor failure.

In another aspect, the method includes logging the time of fault, type of fault, number of occurrences of a fault, time of first and last fault (engine hours or time stamp) and distance traveled with said fault.

The engine components may be selected from an EGR, a Variable Geometry Turbocharger, including a Variable Nozzle Turbocharger, a Charge cooler, an air manifold, an engine oil system, an engine coolant system, and controllers within the MCM. Other engine systems have been implemented using turbochargers with electronically controlled wastegates, fixed geometry turbochargers, and electronically controlled EGR valves. The vehicle component may be selected from a transmission, a controller associated with the transmission, a vehicle speed sensor system and a parking brake, vehicle speed sensor, and various driver inputs including engine brake requests and DPF switches among other components Preferably, rationality checks are performed at least once per driving cycle.

These and other aspects of the invention will become apparent upon a reading of the specification.

DETAILED DESCRIPTION OF A PREFERRED EMBODIMENT(S)

Figure 1:
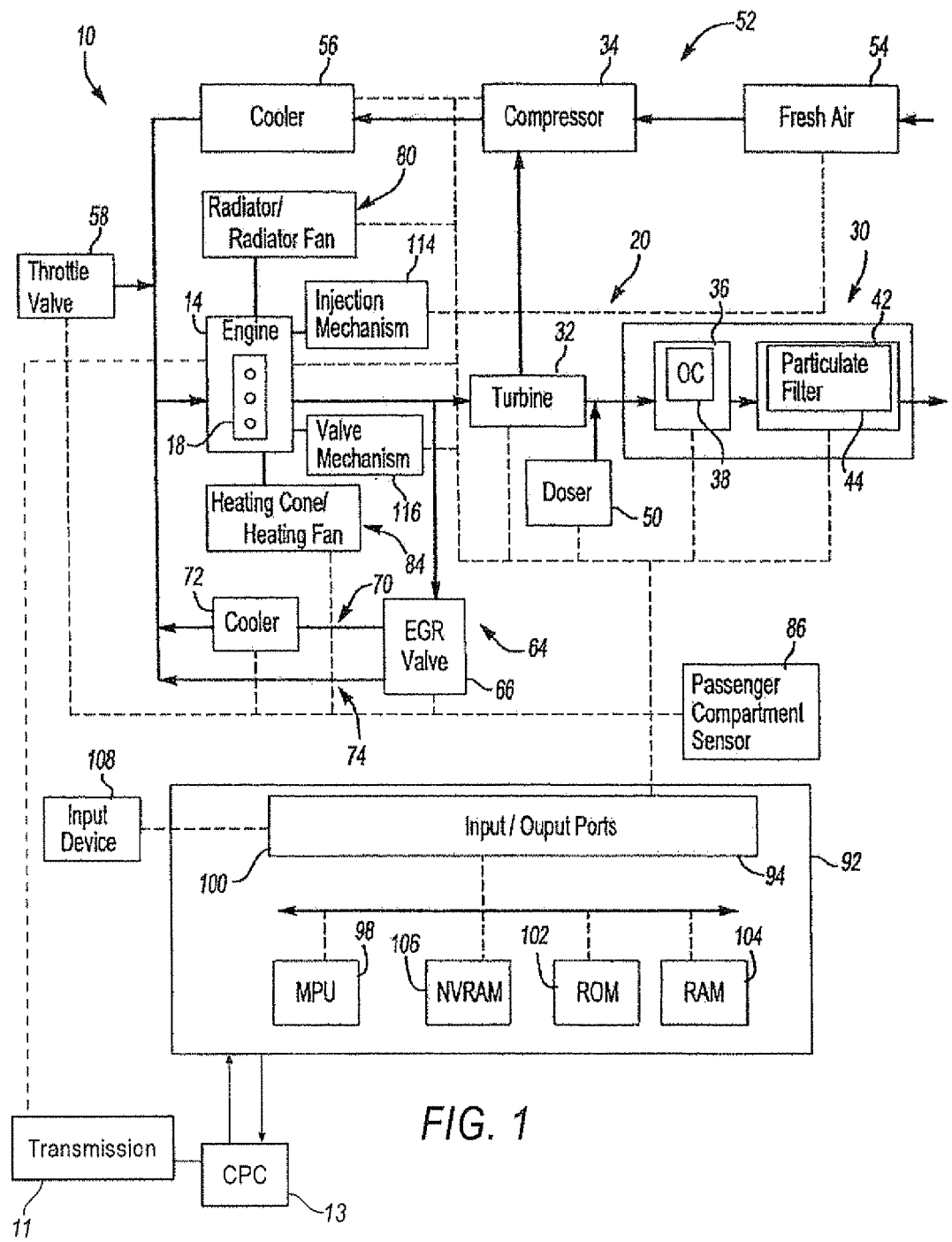
FIG. 1 is a schematic representation of an internal combustion engine and transmission.

FIG. 1 illustrates a vehicle powertrain system 10 in accordance with one non-limiting aspect of the present invention. The system 10 may provide power for driving any number of vehicles, including on-highway trucks, construction equipment, marine vessels, stationary generators, automobiles, trucks, tractor-trailers, boats, recreational vehicle, light and heavy-duty work vehicles, and the like.

The system 10 may be referred to as an internal combustion driven system wherein fuels, such as gasoline and diesel fuels, are burned in a combustion process to provide power, such as with a spark or compression ignition engine 14. The engine 14 may be a diesel engine that includes a number of cylinders 18 into which fuel and air are injected for ignition as one skilled in the art will appreciate. The engine 14 may be a multi-cylinder compression ignition internal combustion engine, such as a 4, 6, 8, 12, 16, or 24 cylinder diesel engines, for example. It should be noted, however, that the present invention is not limited to a particular type of engine or fuel. The engine is cooperatively engaged by transmission 11 by a flywheel and either a clutch or a torque converter as is customary with engines and transmissions. The transmission has an ECU 13, that is in data communication with the engine control system, as will herein after be described.

Exhaust gases generated by the engine 14 during combustion may be emitted through an exhaust system 20. The exhaust system 20 may include any number of features, including an exhaust manifold and passageways to deliver the emitted exhaust gases to a particulate filter assembly 30, which in the case of diesel engines is commonly referred to as a diesel particulate filter. Optionally, the system 20 may include a turbocharger proximate the exhaust manifold for compressing fresh air delivery into the engine 14. The turbocharger, for example, may include a turbine 32 and a compressor 34, such as a variable geometry turbocharger (VGT) and/or a turbo compound power turbine. Of course, the present invention is not limited to exhaust systems having turbochargers or the like.

The particulate filter assembly 30 may be configured to capture particulates associated with the combustion process. In more detail, the particulate filter assembly 30 may include an oxidation catalyst (OC) canister 36, which in includes an OC 38, and a particulate filter canister 42, which includes a particulate filter 44. The canisters 36, 42 may be separate components joined together with a clamp or other feature such that the canisters 36, 42 may be separated for servicing and other operations. Of course, the present invention is not intended to be limited to this exemplary configuration for the particulate filter assembly 30. Rather, the present invention contemplates the particulate filter assembly including more or less of these components and features. In particular, the present invention contemplates the particulate filter assembly 30 including only the particulate filter 44 and not necessarily the OC canister 36 or substrate 38 and that the particulate filter 44 may be located in other portions of the exhaust system 20, such as upstream of the turbine 32.

The OC 38, which for diesel engines is commonly referred to as a diesel oxidation catalyst, may oxidize hydrocarbons and carbon monoxide included within the exhaust gases so as to increase temperatures at the particulate filter 44. The particulate filter 44 may capture particulates included within the exhaust gases, such as carbon, oil particles, ash, and the like, and regenerate the captured particulates if temperatures associated therewith are sufficiently high. In accordance with one non-limiting aspect of the present invention, one object of the particulate filter assembly 30 is to capture harmful carbonaceous particles included in the exhaust gases and to store these contaminates until temperatures at the particulate filter 44 favor oxidation of the captured particulates into a gas that can be discharged to the atmosphere.

The OC and particulate filter canisters 36, 42 may include inlets and outlets having defined cross-sectional areas with expansive portions there between to store the OC 38 and particulate filter 44, respectively. However, the present invention contemplates that the canisters 36, 42 and devices therein may include any number configurations and arrangements for oxidizing emissions and capturing particulates. As such, the present invention is not intended to be limited to any particular configuration for the particulate filter assembly 30.

To facilitate oxidizing the capture particulates, a doser 50 may be included to introduce fuel to the exhaust gases such that the fuel reacts with the OC 38 and combusts to increase temperatures at the particulate filter 44, such as to facilitate regeneration. For example, one non-limiting aspect of the present invention contemplates controlling the amount of fuel injected from the doser as a function of temperatures at the particulate filter 44 and other system parameters, such as air mass flow, EGR temperatures, and the like, so as to control regeneration. However, the present invention also contemplates that fuel may be included within the exhaust gases through other measures, such as by controlling the engine 14 to emit fuel with the exhaust gases.

An air intake system 52 may be included for delivering fresh air from a fresh air inlet 54 through an air passage to an intake manifold for introduction to the engine 14. In addition, the system 52 may include an air cooler or charge air cooler 56 to cool the fresh air after it is compressed by the compressor 34. Optionally, a throttle intake valve 58 may be provided to control the flow of fresh air to the engine 14. Optionally, the throttle intake valve 58 may also be provided to control the flow of EGR gases to the engine 14 or control both fresh air and EGR gases 64 to the engine 14. The throttle valve 58 may be a manually or electrically operated valve, such as one which is responsive to a pedal position of a throttle pedal operated by a driver of the vehicle. There are many variations possible for such an air intake system and the present invention is not intended to be limited to any particular arrangement. Rather, the present invention contemplates any number of features and devices for providing fresh air to the intake manifold and cylinders, including more or less of the foregoing features.

An exhaust gas recirculation (EGR) system 64 may be optionally provided to recycle exhaust gas to the engine 14 for mixture with the fresh air. The EGR system 64 may selectively introduce a metered portion of the exhaust gasses into the engine 14. The EGR system 64, for example, may dilute the incoming air charge and lower peak combustion temperatures to reduce the amount of oxides of nitrogen produced during combustion. The amount of exhaust gas to be recirculated may be controlled by controlling an EGR valve 66 and/or in combination with other features, such as the turbocharger. The EGR valve 66 may be a variable flow valve that is electronically controlled. There are many possible configurations for the controllable EGR valve 66 and embodiments of the present invention are not limited to any particular structure for the EGR valve 66.

The EGR system 64 in one non-limiting aspect of the present invention may include an EGR cooler passage 70, which includes an EGR cooler 72, and an EGR cooler bypass 74. The EGR valve 66 may be provided at the exhaust manifold to meter exhaust gas through one or both of the EGR cooler passage 70 and bypass 74. Of course, the present invention contemplates that the EGR system 64 may include more or less of these features and other features for recycling exhaust gas. Accordingly, the present invention is not intended to be limited to any one EGR system and contemplates the use of other such systems, including more or less of these features, such as an EGR system having only one of the EGR cooler passage or bypass.

A cooling system 80 may be included for cycling the engine 14 by cycling coolant there through. The coolant may be sufficient for fluidly conducting away heat generated by the engine 14, such as through a radiator. The radiator may include a number of fins through which the coolant flows to be cooled by air flow through an engine housing and/or generated by a radiator fan directed thereto as one skilled in the art will appreciated. It is contemplated, however, that the present invention may include more or less of these features in the cooling system 80 and the present invention is not intended to be limited to the exemplary cooling system described above.

The cooling system 80 may operate in conjunction with a heating system 84. The heating system 84 may include a heating core, a heating fan, and a heater valve. The heating core may receive heated coolant fluid from the engine 14 through the heater valve so that the heating fan, which may be electrically controllable by occupants in a passenger area or cab of a vehicle, may blow air warmed by the heating core to the passengers. For example, the heating fan may be controllable at various speeds to control an amount of warmed air blown past the heating core whereby the warmed air may then be distributed through a venting system to the occupants. Optionally, sensors and switches 86 may be included in the passenger area to control the heating demands of the occupants. The switches and sensors may include dial or digital switches for requesting heating and sensors for determining whether the requested heating demand was met. The present invention contemplates that more or less of these features may be included in the heating system and is not intended to be limited to the exemplary heating system described above.

A controller 92, such as an electronic control module or engine control module, may be included in the system 10 to control various operations of the engine 14 and other system or subsystems associated therewith, such as the sensors in the exhaust, EGR, and intake systems. Various sensors may be in electrical communication with the controller via input/output ports 94. The controller 92 may include a microprocessor unit (ECU) 98 in communication with various computer readable storage media via a data and control bus 100. The computer readable storage media may include any of a number of known devices which function as read only memory 102, random access memory 104, and non-volatile random access memory 106. A data, diagnostics, and programming input and output device 108 may also be selectively connected to the controller via a plug to exchange various information therebetween. The device 108 may be used to change values within the computer readable storage media, such as configuration settings, calibration variables, instructions for EGR, intake, and exhaust systems control and others.

The system 10 may include an injection mechanism 114 for controlling fuel and/or air injection for the cylinders 18. The injection mechanism 114 may be controlled by the controller 92 or other controller and comprise any number of features, including features for injecting fuel and/or air into a common-rail cylinder intake and a unit that injects fuel and/or air into each cylinder individually. For example, the injection mechanism 114 may separately and independently control the fuel and/or air injected into each cylinder such that each cylinder may be separately and independently controlled to receive varying amounts of fuel and/or air or no fuel and/or air at all. Of course, the present invention contemplates that the injection mechanism 114 may include more or less of these features and is not intended to be limited to the features described above.

The system 10 may include a valve mechanism 116 for controlling valve timing of the cylinders 18, such as to control air flow into and exhaust flow out of the cylinders 18. The valve mechanism 116 may be controlled by the controller 92 or other controller and comprise any number of features, including features for selectively and independently opening and closing cylinder intake and/or exhaust valves. For example, the valve mechanism 116 may independently control the exhaust valve timing of each cylinder such that the exhaust and/or intake valves may be independently opened and closed at controllable intervals, such as with a compression brake. Of course, the present invention contemplates that the valve mechanism may include more or less of these features and is not intended to be limited to the features described above.

In operation, the controller 92 receives signals from various engine/vehicle sensors and executes control logic embedded in hardware and/or software to control the system 10. The computer readable storage media may, for example, include instructions stored thereon that are executable by the controller 92 to perform methods of controlling all features and sub-systems in the system 10. The program instructions may be executed by the controller in the ECU 98 to control the various systems and subsystems of the engine and/or vehicle through the input/output ports 94. In general, the dashed lines shown in FIG. 1 illustrate the optional sensing and control communication between the controller and the various components in the powertrain system. Furthermore, it is appreciated that any number of sensors and features may be associated with each feature in the system for monitoring and controlling the operation thereof.

In one non-limiting aspect of the present invention, the controller 92 may be the DDEC controller available from Detroit Diesel Corporation, Detroit, Mich. Various other features of this controller are described in detail in a number of U.S. patents assigned to Detroit Diesel Corporation. Further, the controller may include any of a number of programming and processing techniques or strategies to control any feature in the system 10. Moreover, the present invention contemplates that the system may include more than one controller, such as separate controllers for controlling system or subsystems, including an exhaust system controller to control exhaust gas temperatures, mass flow rates, and other features associated therewith. In addition, these controllers may include other controllers besides the DDEC controller described above.

In accordance with one non-limiting aspect of the present invention, the controller 92 or other feature, may be configured for permanently storing emission related fault codes in memory that is not accessible to unauthorized service tools. Authorized service tools may be given access by a password and in the event access is given, a log is made of the event as well as whether any changes that are attempted to made to the stored fault codes. It is contemplated that any number of faults may be stored in permanent memory, or rewritable memory, and that preferably such faults are stored in rewritable memory.

Figure 2:
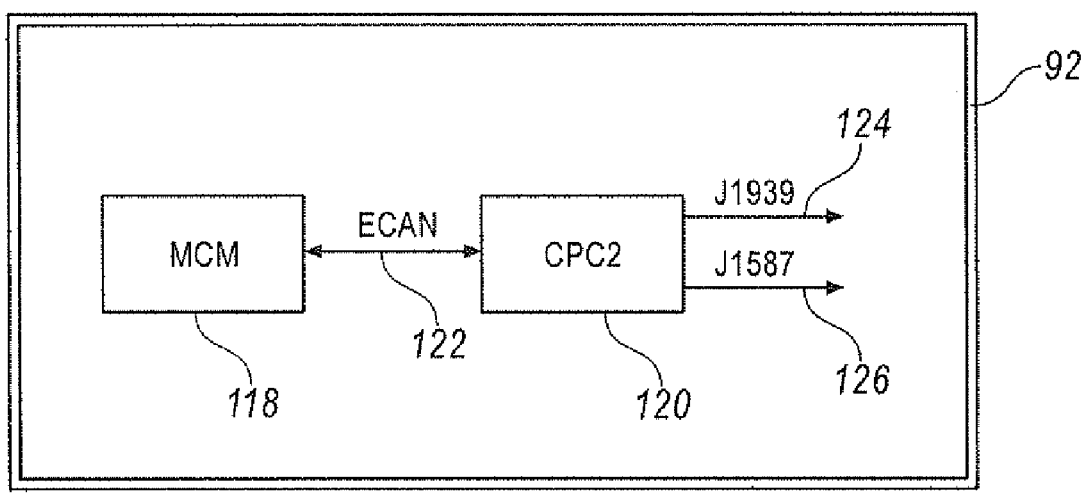
FIG. 2 is a schematic representation of the Motor Control Module useful in the present invention.

FIG. 2 is a schematic representation of the controller 92 of the present invention. The engine control system has a Motor Control Module 118 and a Common Powertrain Controller 120. Each of the Common Powertrain Controller and the Motor Control Module has memory for storage and retrieval of operating software and faults. The Motor Control Module and the Common Powertrain Controller (CPC2) communicate with each other via a data link, such as the electronic common area network (ECAN) 122. It is contemplated that any electronic communication between the Motor Control Module (MCM) and the Common Powertrain Controller is acceptable to communicate static faults stored in either, so that each has the most current version of the faults in the other module at any time. The Common Powertrain Controller communicates with the vehicle systems via an SAE data link J1939 and J 1587, (124 and 126, respectively) and it is contemplated that it is equally possible that the Common Powertrain Controller (CPC2) may communicate with the various systems over a UDS link.

Figure 3:
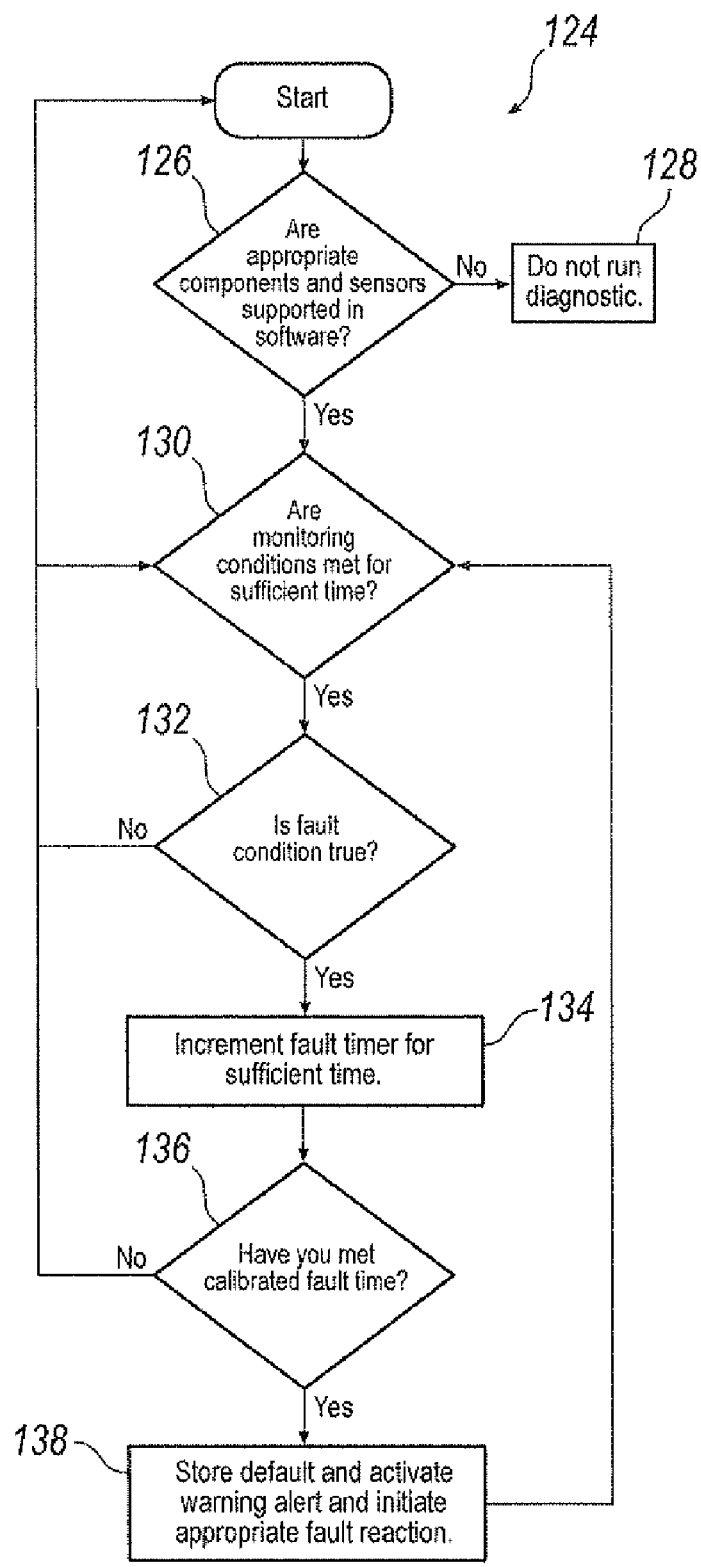
FIG. 3 is a software flow chart of one method according to the present invention.

FIG. 3 is a schematic representation of a software flowchart showing the steps of one method 124 according to the present invention. Step 126 is determining whether the appropriate components and/or sensors supported by the software in the controller. If no, step 128 is do not run diagnostic for any such unsupported sensor or component. If the determination to step 126 is yes, step 130 is determining whether the monitoring conditions for the rationality check have been met. Monitoring conditions include, but are not limited to engine parametric values being within a specified range, having no known faults for relevant inputs to specific diagnostics, and fulfillment of timers, specific system events, etc. If no, the software loops back to the step 126. If yes, step 132 is determining whether the fault condition is true or accurate. If no, the software loops back to step 130. If yes, step 134 is increment fault timer for sufficient time to ensure any fault detected is valid. Step 136 is determining whether the fault condition indication has met the calibrated fault time to be considered a valid fault. If no, the software loops back to step 130. If yes, step 138 is logging the fault as a DTC or otherwise, activating a warning alert and otherwise instituting appropriate fault reactions. The software then loops back to step 130 in a continuous loop so that as long as the engine is on and ignition is on, the method to verify EGR & Air system functionality continually.

Preferably, when the state or level of measured or controlled parameters are in the condition or range described as a monitoring condition, the rationality check of a subject sensor or controlled component may be conducted. In usual practice, engine speeds and torques are selected that will be used to define speed and load limits. These are populated into a table for monitoring condition selections. Rationality checks are to be made with the engine is operating in a specified range of speed and torque. All variants of rationality checks cannot effectively be made when the engine is operating in the same speed and torque range. Therefore, multiple, preferably six, calibratable levels of each engine speed and engine torque are each defined. These are populated into a table in the MCM. When engine speed and engine torque monitoring conditions for a particular rationality diagnostic are defined, two engine speed levels (minimum and maximum engine speed) and two engine torque levels (minimum and maximum engine torque) are selected to define the desired range of engine operation for the diagnostic. In other words, two engine speeds levels and two engine torque levels are defined to give the desired range of engine operation for the diagnostic. Most preferably, once the engine speeds and torques for conducting rationality checks have been selected and populated into a table, a master monitoring table may be created listing the monitor name/ID and the speed and torque levels that have been selected to define the limits of the monitoring range.

Current MCM software provides circuit diagnostics, such as failed high, short to battery, short to ground, for all input sensors. Sensors not exhibiting hard circuit failures may adversely affect emissions as a result of in range failures of the sensors. In one aspect, the present invention involves detection and management of in range failures of emissions related inputs. In this regard, the system is always active and continuously monitors emissions related sensors and components to verify component functionality or log faults when the component is found to be in range but indicative of an impending failure. The method provides that if there is a short in any of the sensors used for a particular rationality check, the rationality check for that sensor is bypassed unless otherwise specified. The window of operation defined for each of the rationality tests may be determined by operator defined calibration parameters, loaded into memory. In any event, the window of operation is comprised of a minimum engine speed threshold, a maximum engine speed threshold, a minimum torque threshold and a maximum torque threshold. A fault is logged if the monitoring conditions are true for a consecutive period of time exceeding a calibration time threshold for a number of occurrences determined by a calibration parameter, and a number of drive cycles determined by a calibration parameter. The rationality checks are always performed, unless otherwise specified. Fault conditions are stored in memory and may be retrieved or cleared by a service tool. Thus, for all faults, a calibratable derate is contemplated.

In the event that a circuit continuity or sensor out of range fault is detected for any EMD related component, the MIL and any other appropriate lamps are generally enabled and activated as a warning alert to an operator. All rationality diagnostics that require information based on that component in order to conduct the rationality check are disabled for as long as the circuit continuity or sensor out of range fault is detected. In the event that a circuit continuity failure is detected, the rationality check is not logged.

In view of the foregoing, it is contemplated that the distance traveled and total engine operation time in seconds with the MIL fault activated, number of occurrences of each emission related fault and the time of first and last fault (i.e., engine hours and time stamp) are logged.

In the event of continuity or rationality faults for any inputs to the engine control system including, but not limited to intake manifold temperature, CAC outlet Temperature, EGR temperature, ambient pressure, inlet manifold pressure, intake throttle position, EGR position, wastegate position, EGR flow, air flow and status of relevant power supplies, the calibrator can select that the Variable Geometry Turbine, including the Variable Nozzle Turbocharger, or Wastegate governor will disable its feedback path and switch to pure forward control. For some engines, the EGR governors (i.e., EGR valve, volute connection valve and intake throttle) will disable their feedback path and switch to a pure feed forward control. For other engines, the calibrator has the option to disable the EGR governor (i.e., the EGR valve, volute connection valve and intake throttle) feedback path and switch to a pure feedforward control or allow the model based EGR governor to continue to operate without change.

In the event that a circuit continuity or plausibility fault is identified for sensors identified with the intake manifold boost pressure, EGR mass flow delta pressure or intake air mass flow delta pressure, the calibrator is provided the option of using a fixed scalar value for the default or a tabular default value that varies as a function of engine speed.

For all faults described in this invention, a specific fault code is stored and the calibrator is able to calibrate the appropriate warning alerts (i.e. enablement of appropriate lamps such as Malfunction Indicator Lamp (MIL) and/or Amber Warning Lamp (AWL), and Red Stop Lamp (RSL) text displays and audio message) and fault reactions.

The calibratible fault reactions include, but are not limited to, various levels of engine derates (speed and/or torque), engine shutdowns, and other specified fault reactions such as closure of the EGR valve, using feed-forward tables for VGT control, the disablement of DPF regeneration by inhibiting either the injection of fuel to the oxidation catalyst or inhibiting the engine throttle mode necessary to achieve exhaust temperatures required for regeneration etc., will be activated for operator notice.

All diagnostics described in this invention may also have a calibratible minimum time that the monitoring conditions must all be met prior to conducting the check. This stabilization time is necessary due to both sensor response and inherent system time delays during transient operation.

All diagnostics described in this invention also include the following monitoring conditions which are not included in the individual fault descriptions. Any diagnostics are disabled if there are any active faults for any inputs relevant to the specific diagnostic which may include inputs such as intake manifold pressure or charge air cooler outlet pressure, intake manifold temperature, coolant temperature, EGR valve position, DPF inlet pressure, and intake throttle position, and grid heater status.

When performing a rationality check on the inlet manifold pressure at ambient barometric pressure at low engine speed and low engine torque, it is usually expected that the intake manifold pressure and the ambient barometric pressure at the intake will be similar. Monitoring conditions (conditions under which the check is made) include the appropriate engine speed and torque selected for that particular rationality check as well as the position of the intake throttle. Additionally, there must not be any active faults for any inputs to this diagnostic which include the barometric pressure sensor, intake manifold pressure or charge air cooler outlet pressure and intake throttle position. If a circuit fault condition is detected for the barometric pressure sensor, other control system functions that require barometric pressure shall use either the most recent barometric pressure or the turbocharger inlet compressor pressure (if available on the system). It is understood that because barometric pressure changes with elevation change, the assumed barometric pressure is updated using the measured intake manifold pressure when the engine is next operating at an idle mode operation condition. A fault condition is noted when the absolute pressure differential between the intake manifold pressure and barometric pressure exceeds a calibratable maximum threshold (optionally charge air cooler outlet pressure may be used instead of intake manifold pressure) for a calibratable period of time and a calibratable number of occurrences and a calibratable number of drive cycles. The specific fault code is stored and the appropriate fault reactions and warning alerts are enabled as previously described. It is also understood that both the intake manifold pressure prior to the EGR entrance and the intake manifold pressure downstream of the EGR entrance could be referred to as inlet manifold pressure for a particular engine platform.

When the engine is operating at high engine speed and high engine torque conditions, it is expected that the intake manifold pressure is elevated due to turbocharger boosting of pressure. Therefore, the intake manifold pressure is greater that the ambient barometric pressure. The method of the present invention detects if, under specified conditions, the intake manifold pressure fails to reach a minimum expected level. Monitoring conditions are the appropriate speed and torque conditions and the appropriate throttle position. Fault conditions are indicated when the difference between intake manifold pressure and barometric pressure is less than a calibratable minimum threshold for a calibratable period of time and a calibratable number of occurrences and a calibratable number of drive cycles. The specific fault code is stored and the appropriate fault reactions and warning alerts are enabled as previously described.

When an engine is operating at high speeds and high loads, the intake manifold pressure is expected to be above a minimum level. To perform a range check, the monitoring conditions are operating the engine at the appropriate engine speed and engine torque, and monitoring the intake throttle position so that it is less than a calibratable threshold. Fault conditions noted when intake manifold pressure is less than a calibratable minimum threshold for a calibratable period of time and for a calibratable number of occurrences and for a calibratable number of drive cycles. The specific fault code is stored and the appropriate fault reactions and warning alerts are enabled as previously described.

When the engine is operating at low speeds and low loads, the intake manifold pressure is expected to be below a maximum level. To perform a range check, monitoring condition are the appropriate speed and torque, and a throttle position less than a calibratable threshold value. Fault condition noted when intake manifold pressure is greater than a calibratable maximum threshold for a calibratable period of time, and for a calibratable number of occurrences, and for a calibratable number of drive cycles. The specific fault code is stored and the appropriate fault reactions and warning alerts are enabled as previously described.

The rationality check on the inlet manifold temperature sensor includes the EGR temperature sensor. When the engine is warm and operating under the appropriate high speed and high torque conditions and appropriate EGR flow rate, the EGR temperature will be greater than the inlet manifold temperature. Monitoring conditions include the operating the engine at the appropriate speed and torque, EGR demand is greater than a calibratable minimum value and engine coolant temperature is greater than a calibratable minimum value. A fault is indicated if the EGR temperature minus the inlet manifold temperature is less than a calibratable threshold for a period of time exceeding the calibratable faulty timer and a calibratable number of occurrences is exceeded, and a calibratable number of drive cycles. The specific fault code is stored and the appropriate fault reactions and warning alerts are enabled as previously described.

One rationality check between the inlet manifold temperature sensor and the charge air cooler outlet temperature sensor occurs as follows. When the engine speed is low and the engine torque is low, and the EGR flow is low, the temperatures before and after the EGR addition should be similar. A comparison is conducted and the temperature before the EGR addition and after the EGR addition should be within a predefined delta. The monitoring conditions are that engine speed and torque must be within a predetermined range, EGR is less than a calibratable maximum value, engine coolant temperature is greater than a calibratable minimum value, and a grid is not enabled, and the temperature before and after the EGR addition is greater than a calibratable maximum low engine speed delta. A fault is indicated if temperature after EGR addition minus temperature before EGR addition exceeds a calibratable maximum for a calibratable period of time exceeding a calibratable fault time and calibratable number of occurrences and driving cycles. The specific fault code is stored and the appropriate fault reactions and warning alerts are enabled as previously described.

It is also possible to conduct a rationality check between the inlet manifold temperature sensor and the charge air cooler outlet temperature at high engine speed and high engine torque. It is expected that under high engine speed and high engine torque and high EGR flow, the temperatures entering the intake manifold before the EGR entrance will be high. The temperature after EGR addition should be significantly higher that the temperature before EGR addition. The engine control system compares the two temperatures and they must be different by at least a predefined delta. Monitoring conditions include the operating at the appropriate engine speed and engine torque, EGR demand is above a calibratable threshold, and engine coolant temperature is above a predetermined threshold. A fault is indicated if the temperature before EGR addition minus the temperature after EGR addition is less than a calibratable threshold for a period of time exceeding the calibratable fault time and calibratable number of occurrences and driving cycles is exceeded. The specific fault code is stored and the appropriate fault reactions and warning alerts are enabled as previously described.

The inlet manifold temperature range check at low speed and low torque can also be accomplished. It is expected that under low engine speed and low engine torque conditions the mixed gas temperatures in the intake manifold before the EGR entrance will be low. The software must consider the in the case of an engine that has moved to a low speed and torque condition from a high speed and high torque condition, it may take a period of time for temperatures to stabilize at the lower levels. Monitoring conditions include the appropriate engine speed and torque conditions, and that no grid heater is activated. A fault is indicated if inlet manifold temperature after EGR addition is greater than a calibratable threshold amount. The specific fault code is stored and the appropriate fault reactions and warning alerts are enabled as previously described.

For a check on an inlet manifold temperature for engine with a before and after EGR temperature sensor but no EGR temperature sensor, the rationality check is between the inlet manifold temperature sensor and the charge air coolant outlet temperature sensor. When the engine speed and engine torque are low and the EGR flow is low, the temperatures before and after the EGR addition should be similar. A comparison is done and the temperature detected by the sensor after EGR addition and the sensor before EGR addition must be within a predefined calibratable range. Monitoring conditions include EGR demand is less than a calibratable maximum value, engine coolant temperature is greater than a calibratable minimum value, or the grid heater is not enabled. A fault is indicated if the temperature after EGR addition minus the temperature before EGR addition is greater than a calibratable maximum low rpm delta. The specific fault code is stored and the appropriate fault reactions and warning alerts are enabled as previously described.

Additionally, a rationality check may be conducted between the inlet manifold temperature sensor and the charge air cooler outlet temperature sensor (e.g. before and after EGR addition) when the engine speed and torque are both high and the EGR flow is high. In this case, the temperature after EGR addition should be significantly higher than before EGR addition. Monitoring conditions include the EGR flow is greater than a calibratable minimum value or the Engine coolant temperature is greater than a calibratable minimum value. A fault condition exists if the difference between the temperature before and after EGR addition is less that a calibratible minimum threshold. The specific fault code is stored and the appropriate fault reactions and warning alerts are enabled as previously described.

For a rationality check of the inlet manifold temperature range at low speed and low engine torque, it is expected that under low speed and torque conditions, the temperatures entering the intake manifold before the EGR entrance will be low. The Software considers the case of an engine that has moved to a low speed and torque condition from a high speed and torque condition where it may take a period of time for temperatures to stabilizer at the lower levels. Monitoring conditions include operating the engine at the appropriate engine speed and torque, a grid heater is not enabled or the EGR flow is less that a calibratable threshold. A fault is indicated is the temperature before EGR addition is greater than a calibratable threshold for a period of time exceeding the calibratable fault timer and a calibratable number of occurrences and driving cycles is exceeded. The specific fault code is stored and the appropriate fault reactions and warning alerts are enabled as previously described.

For inlet manifold temperature range check before EGR addition at high speed and torque, it is expected that the temperatures entering the intake manifold before the EGR entrance will be high. The charge air cooler is designed to limit the sensor before EGR addition to a limited rise above the ambient temperature. Consequently, the minimum calibrated temperature must be calibrated to recognize low ambient temperature operation with the sensor before EGR addition may be significantly reduced due to charge cooler effectiveness. Monitoring conditions include operating the engine at the appropriate speed and torque, engine coolant temperature is greater than a calibratable minimum value and that EGR demand is greater than a calibratable threshold. EGR demand may be determined via many methods including, but not limited to a Pulse Width Modulation percentage, data link command and EGR valve position. A fault is indicated if the temperature before EGR addition is less than a calibratable threshold for a period of time exceeding a calibratable fault timer and a calibratable number of occurrences and driving cycles is exceeded. The specific fault code is stored and the appropriate fault reactions and warning alerts are enabled as previously described.

A rationality check can be performed on the engine oil and engine coolant temperatures sensors. The oil temperature is measured in the oil supply gallery in the engine block that is fed by oil that has been cooled in a heat exchanger by the engine coolant. The oil cooler efficiency is such that the oil temperature is well coupled to the coolant temperature. The oil temperature is characteristically greater than the coolant temperature. The diagnostic detects whether the oil temperature differs from the coolant temperature by greater than a threshold value. If an engine coolant water heater is used, it is contemplated that this effect will be considered when developing calibrations for this type of rationality check. Monitoring conditions include determining whether the coolant temperature is less than a calibrated temperature threshold and whether the engine has been operating for a period of time greater than a calibratable period of time. A fault is indicated if the oil temperature minus the coolant temperature is greater than a calibratable threshold for a period of time exceeding the calibratable fault time and a calibratable number of occurrences and driving cycles is exceeded. The specific fault code is stored and the appropriate fault reactions and warning alerts are enabled as previously described.

After cold engine start, it is expected that the oil temperature will rise as the engine consumes fuel. A rationality check can be conducted to determine that the engine oil temperature has increased above a calibratable threshold after the engine has consumed a calibratable amount of fuel. Monitoring conditions include determining that the amount of fuel consumed since engine start is greater than a calibrated amount. A fault is indicated is the oil temperature is less that a calibratable threshold for a period of time exceeding the calibratable fault timer and a calibratable number of occurrences and a calibratable number of drive cycles. The specific fault code is stored and the appropriate fault reactions and warning alerts are enabled as previously described.

In the event that the coolant temperature sensor is stuck low, the monitoring condition of the oil temperature sensor test cannot be met. A supplementary diagnostic function can be used that is independent of coolant temperature. Monitoring conditions include determining that the oil temperature is greater than a calibrated threshold and the engine has been running for a time exceeding a calibratable threshold time. A fault is indicated if the oil temperature minus the coolant temperature is greater than a calibratable threshold for a period of time exceeding the calibratable fault timer and a calibratable number of occurrences and a calibratable number of drive cycles. The specific fault code is stored and the appropriate fault reactions and warning alerts are enabled as previously described.

Uncooled EGR gas temperature may also give rise to a fault. EGR gasses are cooled through the EGR cooler by the engine coolant. It can be assumed that under high speed and torque, operation of the EGR gas temperature is well above the engine coolant temperature. To perform a rationality check of this sensor, monitoring conditions include operating the engine at the appropriate engine sped and torque, and determining that the coolant temperature is greater than a calibratable threshold. When monitoring conditions are met, if the EGR temperature is less than a calibratable threshold for a period of time exceeding the calibratable fault timer and a calibratable number of occurrences and a calibratable number of drive cycles. The specific fault code is stored and the appropriate fault reactions and warning alerts are enabled as previously described.

A cooled EGR may also give rise to fault. If the engine is operated at high speed and torque, it can be assumed that under high speed and torque, operation of the EGR gas temperature is well above the engine coolant temperature. To perform a rationality check of the EGR temperature sensor, monitoring conditions include operating the engine at the appropriate engine speed and torque, EGR flow is greater than a calibratable value and determining that the coolant temperature is greater than a calibratable threshold. When monitoring conditions are met, if the EGR temperature minus the coolant temperature is less than a calibratable threshold for a period of time exceeding the calibratable fault timer and a calibratable number of occurrences and a calibratable number of drive cycles. The specific fault code is stored and the appropriate fault reactions and warning alerts are enabled as previously described.

If the engine is operating at low speed and torque, the EGR gas temperature can be subjected to a rationality check. EGR gas temperature is relatively low under low speed and torque. The EGR gas temperature will be near the coolant temperature when the EGR flow is within a range of low flow, as indicated by EGR ΔP, and the engine has operated at low speed and torque for a period of time. Monitoring conditions include operating the engine at specific toque and speed, the EGR ΔP is in a calibratable range, and the engine coolant temperature is greater than a calibratable threshold that indicates the engine is warmed up. If the EGR temperature, determined by subtracting the coolant temperature from the EGR gas temperature is greater than the coolant temperature value more than a threshold value, a fault code is recorded for a period of time exceeding the calibratable fault timer and a calibratable number of occurrences and driving cycles is exceeded, the specific fault code is stored and the appropriate fault reactions and warning alerts are enabled as previously described.

The EGR Delta Pressure Signal monitoring at low speed and torque may also be checked. The EGR Delta Pressure sensor will generate a signal indicating flow whenever the EGR valve is commanded to an open position and the air system pressures promote EGR flow. At low speed and torque, and low levels of EGR demand, the resulting EGR delta pressure signal should not exceed a threshold value. Monitoring conditions include operating the engine at the appropriate torque and speed, and determining that the EGR PWM is less than a calibratable value for a period of time exceeding the calibratable fault timer and a calibratable number of occurrences and a calibratable number of drive cycles. The specific fault code is stored and the appropriate fault reactions and warning alerts are enabled as previously described.

If a continuity failure of the EGR Delta Pressure sensor is detected, the method provides options. Specifically, the EGR valve position (PWM %) is to be demanded to a calibratable position and maximum available engine torque at present engine operating speed is reduced to a calibratable percentage of the normally available maximum available engine torque. In addition, the EGR Delta Pressure sensor determination of the EGR flow rate is substituted by virtual management of the EGR rate, and maximum available engine torque at the present engine speed is reduced to a calibratable percentage of the normally available maximum engine torque. In the event of a plausibility failure of the EGR Delta Pressure Sensor, the method can permit an election of whether to continue to use the sensed value or to choose a fault action specified for continuity failure of the signal.

Open circuits may also be detected according to one aspect of the disclosed method. For example, EGR Delta Pressure (count/value) may be stored at ignition on so that at a later time (e.g., engine at idle with EGR valve closed is greater than a calibratable time) the current EGR Delta Pressure may be compared with the stored value for drift check. If not specified in another way, it is contemplated that actions to be taken in a case of failure (e.g. setting of default values, de-rating etc.) shall not be initiated before debouncing phase has been completed.

The method provides for the EGR actuator valve self diagnostics for circuitry continuity and position feedback. The EGR valve indicates to the MCM if the error between the commanded position and the actual position exceeds a calibratable percentage (e.g., 20%). The EGR valve self diagnostics indicate to the MCM if a fault condition exists if the fault exists for a period of time exceeding the calibratable fault timer and a calibratable number of occurrences and a calibratable number of drive cycles. The specific fault code is stored and the appropriate fault reactions and warning alerts are enabled as previously described.

To conduct a plausibility check on the EGR Delta Pressure Sensor signal at high EGR flow, EGR flow is expected to be high when the EGR is demanded at high engine speed and torque conditions. The resulting EGR delta pressure signal should exceed a threshold value. Monitoring conditions include operating the engine at appropriate speed and torque and determining that the EGR PWM is greater than a calibratable value. A fault is indicated if the EGR delta pressure is less that a calibratable threshold a period of time exceeding the calibratable fault timer and a calibratable number of occurrences and a calibratable number of drive cycles. The specific fault code is stored and the appropriate fault reactions and warning alerts are enabled as previously described.

For EGR PWM valves that are equipped with valve position feedback to the MCM, the MCM software will check the feed-back position to the demand position to determine a target error. Monitoring conditions include determining that the engine coolant is warm. A fault is indicated if the desired EGR valve position minus the actual EGR valve position is greater than a calibratable maximum threshold a period of time exceeding the calibratable fault timer and a calibratable number of occurrences and a calibratable number of drive cycles. The specific fault code is stored and the appropriate fault reactions and warning alerts are enabled as previously described.

Similarly, for engines equipped with an EGR PWM valve actuator equipped with feedback to the MCM, the method provides for a rationality check to determine if the indicated valve position is commensurate with EGR at high torque and high speed, as indicated by the EGR delta pressure drop. Monitoring conditions include operating the engine at the appropriate engine speed and engine torque, and determining that EGR delta pressure drop is less than a calibratable value. At high speed and torque, it is not plausible that when EGR delta pressure is small the EGR valve position is open by an amount greater than a calibratable value. A fault is indicated if the EGR valve position is greater than a calibratable maximum threshold a period of time exceeding the calibratable fault timer and a calibratable number of occurrences and a calibratable number of drive cycles. The specific fault code is stored and the appropriate fault reactions and warning alerts are enabled as previously described. In addition, when such a fault is noted, the method provides for an option to continue to use the sensor value or to use a default value associated with circuit failure. In addition, the maximum available engine torque at the present operating speed is to be reduced to a calibratable percentage of the normally available maximum available engine torque.

Similarly, for engines equipped with an EGR PWM valve actuator equipped with a feedback to the MCM, the method provides for a rationality check to determine if the indicated valve position is commensurate with EGR at low engine torque and low engine speed, as indicated by the EGR delta pressure drop. Monitoring conditions include operating the engine at the appropriate engine speed and engine torque, and determining that EGR delta pressure drop is greater than a calibratable value. At low speed and torque, it is not plausible that when EGR delta pressure is large the EGR valve position is open by an amount greater than a calibratable value. A fault is indicated if the EGR valve position is less than a calibratable maximum threshold a period of time exceeding the calibratable fault timer and a calibratable number of occurrences and a calibratable number of drive cycles. The specific fault code is stored and the appropriate fault reactions and warning alerts are enabled as previously described. In addition, when such a fault is noted, the method provides for an option to continue to use the sensor value or to use a default value associated with circuit failure. In addition, the maximum available engine torque at the present operating speed is to be reduced to a calibratable percentage of the normally available maximum available engine torque.

The Variable Nozzle Turbocharger (VNT) valve actuator includes a self diagnostic for circuit continuity and position feed back. The valve will indicate to the MCM if the error between the commanded position and the actual position exceeds a calibratable percentage. The VNT valve indicates to the MCM if a fault condition exists. If the VNT valve indicates that a fault exists for a period of time exceeding the calibratable fault timer and a calibratable number of occurrences are logged, and the number a driving cycles is exceeded. The specific fault code is stored and the appropriate fault reactions and warning alerts are enabled as previously described.

In some engines, the VNT valve actuator is controlled by an output drive that may provide a position feedback signal. The MCM sends the actuator a position command in the form of a PWM signal. Monitoring conditions include continuously deterring that the engine coolant temperature is greater than a calibratable threshold. If the VNT desired position minus the VNT actual position is greater than a calibratable maximum threshold for a period of time exceeding the calibratable fault timer and a calibratable number of occurrences and a calibratable number of drive cycles. The specific fault code is stored and the appropriate fault reactions and warning alerts are enabled as previously described. In addition, the VNT valve position is demanded to a calibratable default position and the maximum available engine torque at the present operating speed is to be reduced to a calibratable percentage of the normally available maximum available engine torque.

In some electronically controlled engines, at high speed and torque, closure of the VNT will increase manifold pressure. For VNT PWM equipped with feedback to the MCM, the method provides for a diagnostic check to determine if intake manifold pressure measured by the intake manifold pressure sensors is commensurate with indicated valve position. Monitoring conditions include operating the engine at appropriate speed and torque, determining if the pressure readings from the sensors are less than a calibratable minimum threshold, determining that the barometric pressure is greater than a calibratable threshold and the intake throttle position is less than a calibratable threshold. A fault is indicated if the VNT position is less (i.e. or closed) than a calibratable value VNT position for a period of time exceeding the calibratable fault timer and a calibratable number of occurrences and a calibratable number of drive cycles. The specific fault code is stored and the appropriate fault reactions and warning alerts are enabled as previously described. The method provides for the option of continuing to use the sensor value or to use a default associated with the circuit failure. In addition, the maximum available engine torque at the present operating speed is to be reduced to a calibratable percentage of the normally available maximum available engine torque.

In other electronically controlled engines, when the engine is operating at high speed and torque, and when the VNT is more open, boost pressures will decrease. For VNT PWM valves that are equipped with valve position feedback to the MCM, a diagnostic check is available that determines if the intake manifold pressure as measured by manifold pressure sensors is commensurate with the indicated valve position. Monitoring conditions include operating the engine at the required speed and torque conditions, and determining that the pressure readings form the pressure sensors is greater than a calibratable maximum threshold. A fault is indicated if the VNT position is greater (i.e. more open) than a calibratable value for a period of time exceeding the calibratable fault timer and a calibratable number of occurrences and a calibratable number of drive cycles. The specific fault code is stored and the appropriate fault reactions and warning alerts are enabled as previously described. The method permits the option of continuing to use the sensor value or to use the default value associated with the circuit failure. In addition, the maximum available engine torque at the present operating speed is to be reduced to a calibratable percentage of the normally available maximum available engine torque.

The turbocharger speed signal is a direct function of the turbocharger speed as determined by the measured frequency. At high engine and torque, the turbocharger speed is expected to be higher than a predetermined level. Monitoring conditions include operating the engine at the appropriate torque and speed. A fault is indicated if the turbocharger speed is less than a calibratable threshold for a period of time exceeding the calibratable fault timer and a calibratable number of occurrences and a calibratable number of drive cycles. The specific fault code is stored and the appropriate fault reactions and warning alerts are enabled as previously described. In addition, because the engine control system usually trims EGR based upon turbocharger speed at low barometric pressures, the EGR valve portion PMW % is to be demanded to a calibratable position. Furthermore, the maximum available engine torque at the present operating speed is to be reduced to a calibratable percentage of the normally available maximum available engine torque.

The turbocharger speed signal is a direct function of the turbocharger speed as determined by the measured frequency. At low engine speed and torque, the turbocharger speed is expected to be lower than a predetermined level. Monitoring conditions include operating the engine at the preferred speed and torque conditions. A fault is indicated if the turbocharger speed is greater that a calibratable threshold for a period of time exceeding the calibratable fault timer and a calibratable number of occurrences and a calibratable number of drive cycles. The specific fault code is stored and the appropriate fault reactions and warning alerts are enabled as previously described.

The method provides a means to test the vehicle speed plausibility by using the engine speed. If the vehicle speed is high, it is expected that engine speed will be high (above a minimum calibratible threshold). Monitoring conditions include continuously monitoring the engine speed, the vehicle speed signal available and the vehicle speed signal valid. A fault is indicated if the vehicle speed signal is greater than a maximum threshold a period of time exceeding the calibratable fault timer and a calibratable number of occurrences and a calibratable number of drive cycles. The specific fault code is stored and the appropriate fault reactions and warning alerts are enabled as previously described.

The method further provides of a means to test vehicle speed sensor reading plausibility with the direct transmission broadcast vehicle speed sensor signal error. Drivetrain components, mainly the transmission, report the transmission output shaft speed signal to a CAN bus. In the event that the diagnostics of the drivetrain component detect a faulty signal, the signal is reported to the data bus as being in error. The monitoring is preferably continuous. A fault code is preferably stored and the MIL illuminating if the fault condition reported by the component exists for a calibratable period of time, number of occurrences and number of drive cycles. The specific fault code is stored and the appropriate fault reactions and warning alerts are enabled as previously described.

The method also provides for means to detect data link failures between the engine control system and vehicle/powertrain components, such as, for example, the common processor controller (CPC2) of a transmission. Monitoring for the condition is preferably continuous. If the CPC detects that a data link failure has occurred and the data link is required to determine the vehicle speed (i.e., using broadcast transmission output shaft speed), the specific fault code is stored and the appropriate fault reactions and warning alerts are enabled as previously described.

If the MCM detects a data link failure has occurred between the MCM and the CPC, and the datalink is required to determine vehicle speed (i.e. using broadcast transmission output shaft speed), a specific fault code is stored and the appropriate fault reactions and warning alerts are enabled as previously described.

To detect tampering with a Vehicle Speed sensor that would cause vehicle speed to be indicated higher than actual speed, the speed is compared to the gearing and engine speed. The monitoring is continuous. A fault is indicated if the vehicle speed is greater than the vehicle speed signal raving diagnostic limit and the vehicle speed diagnostic limit is calibrated to be a non zero value for a period of time exceeding the calibratable fault timer and a calibratable number of occurrences and a calibratable number of drive cycles. The specific fault code is stored and the appropriate fault reactions and warning alerts are enabled as previously described.

The parking brake signal plausibility may also be checked. The park brake is used by the engine control system to enable injection timing advance strategy during cold operation. Advancing the timing provides reduction of unburned fuel during cold operation. Monitoring conditions include ensuring the park brake is set. A fault is indicated if the vehicle speed is greater than a calibratable park brake maximum vehicle speed threshold period of time exceeding the calibratable fault timer and a calibratable number of occurrences and a calibratable number of drive cycles. The specific fault code is stored and the appropriate fault reactions and warning alerts are enabled as previously described.

To detect a park brake signal error, it is understood that the park brake status is used to control some elements of white smoke reduction timing strategies. The status may be sent to the vehicle controller and communicated to the MCM via a data bus. In the event that the CPC detects a faulty park brake signal, the signal is reported to the databus as an error. The park brake status is continuously monitored. A fault is indicated if the park brake signal is reported by a relevant device as being faulty for period of time exceeding the calibratable fault timer and a calibratable number of occurrences and a calibratable number of drive cycles. The specific fault code is stored and the appropriate fault reactions and warning alerts are enabled as previously described.

The plausibility of EGR pressure readings before and after the EGR cooler can be check with plausibility comparison to the intake manifold pressure and ambient barometric pressure at low speed and low engine torque. If an engine is operating in a calibratable, low speed and torque range a minimal intake manifold pressure (IMP) is assumed and that it is expected that the IMP and barometric pressure should be similar to the absolute EGRT pressure. Monitoring conditions include operating the engine at the required speed and torque ranges, the throttle is open (no demand for closure, and the EGR PWM % is greater than a calibratable threshold. If the absolute value of the difference between any two pressure signals is greater than a calibratable value for a period of time exceeding the calibratable fault timer and a calibratable number of occurrences and a calibratable number of drive cycles. The specific DTC is logged and the appropriate warning lamp is illuminated.

If an engine is operating under high speed and torque conditions, a significant pressure differential is expected between EGR absolute pressure and ambient barometric pressure. Monitoring conditions include operating the engine at the required speed and torque ranges, the throttle is open (no demand for closure, and the EGR PWM % is greater than a calibratable threshold. If the absolute value of the difference between any two pressure signals is greater than a calibratable value for a period of time exceeding the calibratable fault timer and a calibratable number of occurrences and a calibratable number of drive cycles. The specific fault code is stored and the appropriate fault reactions and warning alerts are enabled as previously described.

If the engine is operating at high speed and torque, it is expected that the turbocharger compressor outlet temperature will be above a minimum temperature threshold. The fault timer calibration needs to consider soak time effect in this determination. Monitoring conditions include operating the engine at desired torque and speed ranges. A fault is indicated it the turbocharger compressor outlet temperature is less than a calibratable threshold for a period of time exceeding the calibratable fault timer and a calibratable number of occurrences and a calibratable number of drive cycles. The specific fault code is stored and the appropriate fault reactions and warning alerts are enabled as previously described.

If the engine is operating at low speed and torque, it is expected that the turbocharger compressor outlet temperature will be below a maximum temperature threshold. The fault timer calibration needs to consider soak time effect in this determination. Monitoring conditions include operating the engine desired torque and speed ranges. A fault is indicated it the turbocharger compressor outlet temperature is greater than a calibratable threshold for a period of time exceeding the calibratable fault timer and a calibratable number of occurrences and a calibratable number of drive cycles. The specific fault code is stored and the appropriate fault reactions and warning alerts are enabled as previously described.

Concerning general temperature plausibility, after the engine has been turned off and the temperatures have been allowed to stabilize for an adequate period of time, temperature sensors mounted on engine components should measure similar temperatures. The method compares values of the intake manifold temperature, oil and engine coolant, EGR temperatures after the EGR cooler, exhaust temperature before the EGR cooler, and the turbocharger compressor outlet temperature. Should any of the temperatures deviate more than by a calibratable amount from an average of the other temperatures for more than a calibratable period of time, and for a calibratable number of occurrences, and a calibratible number of drive cycles, a specific fault code is stored and the appropriate fault reactions and warning alerts are enabled as previously described. The calibrator has the flexibility to configure any assign any of the available sensors to a specific group or groups of diagnostics. Those assigned to a specific group are averaged together and their deviations compared to the average of the group.

For example, it is expected that gas temperature readings should be similar after adequate soak time. The temperature similarity depends upon the engine soak time history, i.e., temperatures will become more similar as the engine soaks over time to ambient temperature conditions. The method provides for a way to test plausibility of the temperature difference that is a function of engine off time and of engine coolant temperature. Monitoring conditions are that the Diesel Particulate Filter is not regenerating, the ignition is on and a grid heater is not activated. Generally, two separate 2×8 tables are calibrated to define the threshold as a function of each coolant temperature prior to engine off time. It is desirable that the temperatures are measured during the period of time between ignition on and engine cranking. If this time period is not adequate to measure temperatures, the temperatures may be measured within a calibratable period of time after engine cranking ends. At first opportunity after ignition is on, the average temperature is calculated of all gas temperature readings. If any one of the temperature s differs from the calculated average by an amount greater than either of the temperature threshold delta values in the above tables a fault code is logged.

The compressor inlet temperature may be compared to the engine coolant for a plausibility check. Under specified speed and torque operation, the engine coolant is typically higher than the compressor temperature once the engine coolant has warmed. When monitoring conditions are met, if the engine coolant temperature is not higher than the compressor temperature by more than a threshold value, a fault code is recorded and the MIL is illuminated. The monitoring conditions are operating the engine at the desired engine speed and torque. If the engine coolant minus the compressor temperature is less than a minimum calibratable delta value for a period of time exceeding the calibratable fault timer and a calibratable number of occurrences and driving cycles. The specific fault code is stored and the appropriate fault reactions and warning alerts are enabled as previously described.

The method further provides for a rationality check on the EGR flow target error at low flow. Under most engine speeds and torques, it is anticipated that the control system will demand EGR flow in order to meet NOx emissions requirements. Proper control is essential to avoid engine damage by too little EGR, causing excessive turbocharger speed and cylinder pressures. The control system for the EGR will adjust the EGR valve and turbocharger parameters to increase or decrease EGR mass flow so that the measured EGR mass flow matches the demanded EGR mass flow. The monitoring conditions include operating the engine at the requires speed and torque ranges, and the observed EGR mass flow demand minimum is less that the EGR mass flow demand which is less than the observed EGR massflow demand maximum. If the EGR mass flow desired EGR massflow measures is greater than the observed ER massflow delta maximum at low flow for a period of time exceeding the calibratable fault timer and a calibratable number of occurrences and the number of driving cycles. The specific fault code is stored and the appropriate fault reactions and warning alerts are enabled as previously The method further provides for a rationality check on the EGR flow target error at high flow. Under most engine speeds and torques, it is anticipated that the control system will demand EGR flow in order to meet NOx emissions requirements. Proper control is essential to avoid engine damage by too little EGR, causing excessive turbocharger speed and cylinder pressures. The control system for the EGR will adjust the EGR valve and turbocharger parameters to increase or decrease EGR mass flow so that the measured EGR mass flow matches the demanded EGR mass flow. The monitoring conditions include operating the engine at the required speed and torque ranges, and the observed EGR mass flow demand minimum is greater than the EGR mass flow demand. If the EGR mass flow, derived EGR massflow, and the measured EGR massflow is greater than the observed EGR massflow delta maximum at high flow for a period of time exceeding the calibratable fault timer and a calibratable number of occurrences and the number driving cycles. The specific fault code is stored and the appropriate fault reactions and warning alerts are enabled as previously described.

In braking mode where no EGR flow is demanded it is desirable to identify leakage of the EGR valve for problems not identified by position feedback detection. If leakage is occurring, engine braking performance is compromised. Monitoring conditions include enabling engine brakes and FOR PWM % is less than observed EGR PWM % leak detect. A fault is indicated if the EGR measured massflow is greater than the observed EGR massflow leakage at maximum braking for a period of time exceeding the calibratable fault timer and a calibratable number of occurrences and driving cycles. The specific fault code is stored and the appropriate fault reactions and warning alerts are enabled as previously described.

The engine control system will seek to achieve a desired air mass flow level. Engine operation will be dominated by the EGR flow being active in order to maintain emissions compliance. However, operating modes will occur where EGR flow will not be demanded and the control system will adjust air system parameters to achieve desired air massflow with no influence of the EGR system. Proper control is essential to avoid engine damage by either too high air mass flow level resulting from too high boost, or too low air mass flow resulting from too rich combustion causing excessive temperatures and high Diesel Particulate Filter loading. The control system for airflow will adjust the turbocharger parameters to achieve the desired mass airflow rate by comparing the desired air mass flow rate to that measured or calculated from appropriate algorithms and measured engine operating parameters such as intake manifold temperature and pressure and engine speed. Monitoring conditions include operating the engine at the required sped and torque ranges, and determining that desired air massflow is greater than the observed air massflow demand minimum. A fault is indicated if the desired air massflow minus the actual air massflow is greater than the observed air massflow delta maximum power for a period of time exceeding the calibratable fault timer and the calibratable number of consecutive drive cycles wherein the condition occurs is met. The specific fault code is stored and the appropriate fault reactions and warning alerts are enabled as previously described.

The engine control system can also seek to achieve a desired air mass flow level while in braking mode. The control system for airflow may be adjust the turbocharger parameters to achieve the desired mass airflow rate by comparing the desired air mass flow rate to that measured or calculated from appropriate algorithms and measured engine operating parameters such as intake temperature and pressure and engine speed. Monitoring conditions include enabling the engine brakes and determining that the desired air mass flow minus the actual air massflow is greater than the observed air massflow delta maximum braking for a period of time exceeding the calibratable fault timer and the calibratable number of consecutive drive cycles wherein the condition occurs is met. The specific fault code is stored and the appropriate fault reactions and warning alerts are enabled as previously described.

Those skilled in the art understand that the words used in the description of the embodiments of the invention as set forth above are words of description, and not words of limitation. Many variations and modifications will be apparent to those skilled in the art without departing from the scope and spirit of the invention as set forth in the appended claims.

What is claimed as new and desired to be protected by Letters Patent of the United States is:

1. A method for operating an electronically controlled internal combustion engine in a vehicle to perform at least one rationality check on at least one sensor to detect impending sensor failure and verify component functionality; said engine equipped with an engine control system (ECS) having a memory; said ECS in electronic communication with various sensors; said sensors transmitting data signals to said ECS indicative of associated engine and vehicle component functionality; said engine equipped with a coolant system, EGR valve in fluid communication with a manifold having an inlet and an outlet and a turbocharger; said method comprising:

determining engine/vehicle/powertrain operating conditions in which the specified component information from sensor data signals indicative of first and second component functionality;

determining the measured values of a first and second component from sensor data signals indicative of first and second component functionality;

comparing said measured value of said first component to said measured value of said second component to determine whether sensor readings from said first and second components are indicative of a component operating within a normal range or indicative of a component or system failure based on an irrational measured values for some of the parametric information that has been evaluated;

logging an indication of an impending sensor or component failure as a fault in MPU memory if it occurs for a predetermined period of time, occurs more than a predetermined number of times and drive cycles; and activating a warning alert to an operator and initiating remedial actions responsive to said indication of impending component or sensor failure.

2. The method of claim 1, wherein said logging includes time of fault, type of fault, number of occurrences of said fault, number of drive cycles where said fault occurred, length of time of engine operation since fault occurred, and distance traveled with said fault logged.

3. The method of claim 1, wherein said logging includes calibrated fault reactions which may include various levels of engine speed or engine torque derates, engine shutdowns, and other specified fault reactions such as closure of the EGR valve, using feed-forward tables for VGT control, the disablement of DPF regeneration by inhibiting either the injection of fuel to the oxidation catalyst or inhibiting the engine throttle mode necessary to achieve exhaust temperatures required for regeneration.

4. The method of claim 1, further including determining limits of a normal range of operation for monitoring each particular rationality diagnostic to verify sensor and component functionality.

5. The method of claim 4, wherein said limits of a normal range of operation include specific limited levels of high engine speed, high engine torque and low engine speeds, low engine torque.

6. The method of claim 5, wherein said specified limited levels include two engine speed levels and two engine torque levels.

7. The method of claim 1, wherein all rationality diagnostics that require information based upon a component that is indicated as out of range normal in order to conduct a rationality diagnostic is disabled for as long as a circuit continuity or fault is detected and said rationality diagnostic is not logged.

8. The method of claim 1, wherein said first component is an EGR valve and a rationality diagnostic check is related to temperature or pressure and said second component is a VGT governor or Wastegate governor, wherein at least one of said governors is disabled to enable a feedback path and switch to pure forward control.

9. The method of claim 1 wherein said first component is an EGR valve and a rationality diagnostic is related to temperature or pressure, wherein EGR governors are able to alter their feedback path and switch to pure feed forward control or allow a model based EGR governor to continue to operate without change.

10. The method of claim 9, wherein said first component is an EGR valve and said second component is an intake manifold; a rationality check on said EGR valve is performed by determining ambient barometric pressure; determining barometric pressure at said manifold downstream of said EGR valve; comparing said barometric pressures to determine whether said EGR valve is operating in a normal range but indicative of an impending sensor or component failure.

11. The method of claim 10, wherein when said engine is operating at low torque and low speed, a fault condition is logged when a difference in measured intake manifold pressure or charge air cooler outlet pressure compared to the ambient barometric pressure is greater than a calibratable maximum threshold for a calibratable period of time and a calibratable number of occurrences and a calibratable number of drive cycles.

12. The method of claim 10, wherein when said engine is operating at high speed and high torque, a fault is logged when the change in measured intake manifold pressure or charge air cooler outlet pressure compared to ambient barometric pressure is less than a calibratable maximum threshold for a calibratable period of time and a calibratable number of occurrences and a calibratable number of drive cycles.

13. The method of claim 12, wherein when an engine is operating at high speeds and high loads and the intake manifold pressure is expected to be above a minimum level and performing a range check includes operating the engine at the appropriate engine speed and engine torque, and monitoring the intake throttle position so that it is less than a calibratable threshold; a fault is noted when intake manifold pressure or charge air cooler outlet pressure is less than a calibratable minimum value for a calibratable period of time and for a calibratable number of occurrences and for a calibratable number of drive cycles the specific diagnostic fault code is stored and the MIL and any other appropriate lamps are illuminated to warn the operator.

14. The method of claim 9, wherein when the engine is operating at low speeds and low loads, the intake manifold pressure is expected to be below a maximum level and performing a range check includes operating the engine the appropriate speed and torque, and maintaining a throttle position less than a calibratable threshold value; a fault is noted when intake manifold pressure or charge air cooler outlet pressure is greater than a calibratable maximum value for a calibratable period of time, and for a calibratable number of occurrences, and for a calibratable number of drive cycles; the specific diagnostic fault code is stored in memory and the MIL and any other appropriate lamps are illuminated to warn the operator of the fault.

15. The method of claim 9, wherein when the engine is operating at high engine speed and high engine torque conditions, it is expected that the intake manifold pressure is elevated due to turbocharger boosting of pressure and the intake manifold pressure is greater that the ambient barometric pressure, the method includes operating the engine at appropriate speed and torque conditions and the appropriate throttle position fault conditions are indicated when the difference between intake manifold pressure or charge air cooler outlet pressure and barometric pressure is greater than a calibratable maximum threshold for a calibratable period of time and a calibratable number of occurrences and a calibratable number of drive cycles; the specific fault code is stored and the MIL or any other warning alerts, such as lamps, will be activated for operator notice.

16. The method of claim 15, wherein if a circuit fault condition is detected for the barometric pressure sensor, the most recent valid barometric pressure is to be assumed.

17. The method of claim 9, wherein a rationality check on the inlet manifold temperature sensor includes the EGR temperature sensor; said rationality check performed when the engine is warm and operating under the appropriate high speed and high torque conditions and EGR flows, said engine operating at the appropriate speed and torque, EGR demand is greater than a calibratable minimum value, the engine coolant temperature is greater than a calibratable minimum value; a fault is indicated if the EGR temperature minus the inlet manifold temperature is less than a calibratable threshold for a period of time exceeding the calibratable faulty timer and a calibratable number of occurrences is exceeded, and a calibratable number of drive cycles.

18. The method of claim 1, including a rationality check between the inlet manifold temperature sensor and the charge air cooler outlet temperature sensor, when the engine speed is low and the engine torque is low, and the EGR flow is low, by comparing the intake manifold temperature and charge air cooler outlet temperature, monitoring engine speed and torque to ensure they are within a predetermined range; monitoring EGR to ensure it is less than a calibratable maximum value; monitor engine coolant temperature to ensure it is greater than a calibratable minimum value; monitor a grid heater to ensure it is not enabled; a fault is indicated if said temperature after EGR addition minus said temperature before EGR addition exceeds a calibratable maximum for a calibratable period of time exceeding a calibratable fault time and calibratable number of occurrences and driving cycles.

19. The method of claim 18, including a rationality diagnostic on the inlet manifold temperature sensor at low speed and low torque; including considering whether said engine has moved to a low speed and torque condition from a high speed and high torque condition; monitoring the appropriate low engine speed and torque conditions; and that no grid heater is activated; a fault is indicated if inlet manifold temperature after EGR addition is greater than a calibratable threshold amount.

20. The method of claim 18, wherein the rationality diagnostic for inlet manifold temperature for engines using sensors for temperature before and after EGR addition, but do not have a sensor for EGR temperature may be conducted on the inlet manifold temperature sensor when the engine speed and torque are both high and the EGR flow is high and the difference between the temperature before and after FOR addition must be different by at least a pre-defined delta; monitoring the EGR flow is greater than a calibratable minimum value and the Engine coolant temperature is greater than a calibratable minimum value; a fault is indicated if the engine coolant temperature is less than a calibratable minimum threshold.

21. The method of claim 18, wherein said rationality diagnostic of the inlet manifold temperature range at low speed and low engine torque includes considering whether an engine that has moved to a low speed and torque condition from a high speed and torque condition where it may take a period of time for temperatures to stabilize at the lower levels; monitoring operating the engine at the appropriate engine speed and torque, ensuring a grid heater is not enabled or the EGR flow is less that a calibratable threshold; a fault is indicated is the temperature before EGR addition is greater than a calibratable threshold for a period of time exceeding the calibratable fault timer and a calibratable number of occurrences and driving cycles is exceeded.

22. The method of claim 18, wherein said rationality diagnostic of the inlet manifold temperature range a high speed and torque before EGR and charge air cooler addition at said charge air cooler designed to limit the sensor before EGR addition to a limited rise above the ambient temperature; monitoring operating the engine at an appropriate high engine speed and torque, monitoring engine coolant temperature is greater than a calibratable minimum value and that EGR Pulse Width Modulation percentage is greater than a calibratable threshold; a fault is indicated if the temperature before EGR addition is less than a calibratable threshold for a period of time exceeding a calibratable fault timer and a calibratable number of occurrences and driving cycles is exceeded.

23. The method of claim 1, wherein a rationality diagnostic may be performed on the engine oil and engine coolant temperatures sensors; comprising considering the oil temperature is characteristically greater than the coolant temperature; detecting whether the oil temperature differs from the coolant temperature by greater than a threshold value; considering whether if an engine coolant water heater is used, monitoring whether the coolant temperature is less than a calibrated temperature threshold and whether the engine has been operating for a period of time greater than a calibratable period of time; a fault is indicated if the oil temperature minus the coolant temperature is greater than a calibratable threshold for a period of time exceeding the calibratable fault time and a calibratable number of occurrences and driving cycles is exceeded.

24. The method of claim 1, wherein a rationality diagnostic may be performed on the engine oil after a cold start, comprising operating the engine to facilitate oil temperature rise as the engine consumes fuel; said rationality diagnostic conducted to determine that the engine oil temperature has increased above a calibratable threshold after the engine has consumed a calibratable amount of fuel; said rationality diagnostic including determining that the amount of fuel consumed since engine start is greater than a calibrated amount; a fault is indicated when the oil temperature is less that a calibratable threshold for a period of time exceeding the calibratable fault timer and a calibratable number of occurrences and a calibratable number of drive cycles.

25. The method of claim 23, wherein if the coolant temperature sensor is stuck low, the method includes determining that the oil temperature is greater than a calibrated threshold and the engine has been running for a time exceeding a calibratable threshold time; a fault is indicated if the oil temperature minus the coolant temperature is greater than a calibratable threshold for a period of time exceeding the calibratable fault timer and a calibratable number of occurrences and a calibratable number of drive cycles.

26. The method of claim 1, wherein said engine has an EGR actuator valve (Wahler valve) self diagnostics for circuitry continuity and position feedback. The whaler valve indicates to the MPU if the error between the commanded position and the actual position exceeds a calibratable percentage; said Wahler valve self diagnostics indicate to the MPU if a fault condition exists if the fault exists for a period of time exceeding the calibratable fault timer and a calibratable number of occurrences and a calibratable number of drive cycles.

27. The method of claim 9, wherein conducting a plausibility check on the EGR Delta Pressure Sensor signal at high EGR flow, includes operating the engine at appropriate speed and torque and determining that the EGR PWM is greater than a calibratable value; a fault is indicated if the EGR delta pressure is less that a calibratable threshold a period of time exceeding the calibratable fault timer and a calibratable number of occurrences and a calibratable number of drive cycles.

28. The method of claim 1, wherein the EGR has EGR PWM valves that are equipped with valve position feedback to the MPU; said MPU checks the feed-back position to the demand position to determine a target error; monitoring conditions include determining that the engine coolant is warm; a fault is indicated if the desired EGR valve position minus the actual EGR valve position is greater than a calibratable maximum threshold a period of time exceeding the calibratable fault timer and a calibratable number of occurrences and a calibratable number of drive cycles.

29. The method of claim 28, wherein said EGR PWM valve actuator is equipped with a feedback to the MPU, said method provides for a rationality check to determine if the indicated valve position is commensurate with EGR at high torque and high speed, as indicated by the EGR delta pressure drop; operating the engine at the appropriate engine speed and engine torque, and determining that EGR delta pressure drop is less than a calibratable value; a fault is indicated if the EGR valve position is greater than a calibratable maximum threshold a period of time exceeding the calibratable fault timer and a calibratable number of occurrences and a calibratable number of drive cycles.

30. The method of claim 28, further including a rationality check to determine if the indicated valve position is commensurate with EGR at low engine torque and low engine speed, as indicated by the EGR delta pressure drop: operating the engine at the appropriate engine speed and engine torque, and determining that EGR delta pressure drop is greater than a calibratable value; a fault is indicated if the EGR valve position is less than a calibratable maximum threshold a period of time exceeding the calibratable fault timer and a calibratable number of occurrences and a calibratable number of drive cycles.

31. The method of claim 1, wherein said first component is a Variable Nozzle Turbocharger (VNT) valve actuator; said VNT including a self diagnostic for circuit continuity and position feed back; said valve will indicate to the MCM if the error between the commanded position and the actual position exceeds a calibratable percentage for a period of time exceeding the calibratable fault timer and a calibratable number of occurrences are logged, and the number a driving cycles is exceeded.

32. The method of claim 31, wherein the VNT valve actuator is controlled by an output drive that may provide a position feedback signal and the MCM sends the actuator a position command in the form of a PWM signal; said method includes continuously determining that the engine coolant temperature is greater than a calibratable threshold; a fault is indicated if the VNT desired position minus the VNT actual position is greater than a calibratable maximum threshold for a period of time exceeding the calibratable fault timer and a calibratable number of occurrences and a calibratable number of drive cycles and the VNT valve position is demanded to a calibratable default position and the maximum available engine torque at the present operating speed is to be reduced to a calibratable percentage of the normally available maximum available engine torque.

33. The method of claim 31, wherein at high speed and torque, closure of the VNT increases manifold pressure, the method provides for a diagnostic check to determine if intake manifold pressure measured by the intake manifold pressure sensors is commensurate with indicated valve position, said method including operating the engine at appropriate speed and torque, determining if the pressure readings from the sensors are less than a calibratable minimum threshold, determining that the barometric pressure is greater than a calibratable threshold and the intake throttle position is less than a calibratable threshold; a fault is indicated if the VNT position is less (i.e. or closed) than a calibratable value VNT position for a period of time exceeding the calibratable fault timer and a calibratable number of occurrences and a calibratable number of drive cycles, and reducing the maximum available engine torque at the present operating speed is to a calibratable percentage of the normally available maximum available engine torque.

34. The method of claim 31, wherein the engine is operating at high speed and torque; when the VNT is more open, boost pressures will decrease; the method includes a diagnostic check that determines if the intake manifold pressure as measured by manifold pressure sensors is commensurate with the indicated valve position, including operating the engine at the required speed and torque conditions, and determining that the pressure readings form the pressure sensors is greater than a calibratable maximum threshold; a fault is indicated if the VNT position is greater (i.e. more open) than a calibratable value a period of time exceeding the calibratable fault timer and a calibratable number of occurrences and a calibratable number of drive cycles and the maximum available engine torque at the present operating speed is to be reduced to a calibratable percentage of the normally available maximum available engine torque.

35. The method of claim 31, wherein the turbocharger speed signal is a direct function of the turbocharger speed as determined by the measured frequency; said method includes operating the engine at the appropriate torque and speed; a fault is indicated if the turbocharger speed is less than a calibratable threshold for a period of time exceeding the calibratable fault timer and a calibratable number of occurrences and a calibratable number of drive cycles, the EGR valve portion PMW % is to be demanded to a calibratable position and the maximum available engine torque at the present operating speed is reduced to a calibratable percentage of the normally available maximum available engine torque.

36. The method of claim 31, wherein the turbocharger speed signal is a direct function of the turbocharger speed as determined by the measured frequency; said method including operating the engine at the preferred speed and torque conditions; a fault is indicated if the turbocharger speed is greater than a calibratable threshold for a period of time exceeding the calibratable fault timer and a calibratable number of occurrences and a calibratable number of drive cycles.

37. The method of claim 1, including testing the vehicle speed plausibility by using the engine speed; said method including continuously monitoring the engine speed, the vehicle speed signal available and the vehicle speed signal valid; a fault is indicated if the vehicle speed signal is greater than a maximum threshold a period of time exceeding the calibratable fault timer and a calibratable number of occurrences and a calibratable number of drive cycles.

38. The method of claim 37, further providing testing the vehicle speed sensor reading plausibility with the direct transmission broadcast vehicle speed sensor signal error comprising continuously monitoring the vehicle speed sensor broadcast to detect a faulty signal, said signal is reported to the data bus as being in error if the fault condition reported by the component exists for a calibratable period of time, number of occurrences and number of drive cycles.

39. The method of claim 1, wherein said first component is a MPU, said method to detect data link failures between the MPU and vehicle components, including continuously monitoring for the condition; a fault is indicated if the vehicle component detects that a data link failure has occurred.

40. The method of claim 39, wherein said vehicle component is the CPC2 of the transmission, said fault is indicated if the vehicle component detects that a data link failure has occurred and the data link is required to determine the vehicle speed.

41. The method of claim 1, wherein the ECS detects a data link failure has occurred between the ECS and the CPC, and the datalink is required to determine vehicle speed using broadcast transmission output shaft speed, a fault code is logged.

42. The method of claim 41, further including detecting tampering with a Vehicle Speed sensor that would cause vehicle speed to be indicated higher than actual speed, the speed is compared to the gearing and engine speed; continuously monitoring said vehicle speed: a fault is indicated if the vehicle speed is greater than the vehicle speed signal raving diagnostic limit and the vehicle speed diagnostic limit is calibrated to be a non zero value for a period of time exceeding the calibratable fault timer and a calibratable number of occurrences and a calibratable number of drive cycles.

43. The method of claim 1, wherein a parking brake signal plausibility may also be checked; including advancing engine timing to provide a reduction of unburned fuel during cold operation; ensuring the park brake is set; a fault is indicated if the vehicle speed is greater than a calibratable park brake maximum vehicle speed threshold period of time exceeding the calibratable fault timer and a calibratable number of occurrences and a calibratable number of drive cycles.

44. The method of claim 43, wherein to detect a park brake signal error as it is used to control some elements of white smoke reduction timing strategies; the status of the park brake may be sent to the vehicle controller and communicated to the MPU via a data bus; if CPC detects a faulty park brake signal, the signal is reported to the databus as an error; a fault is indicated if the park brake signal is reported by a relevant device as being faulty for period of time exceeding the calibratable fault timer and a calibratable number of occurrences and a calibratable number of drive cycles.

45. The method of claim 9, wherein plausibility of EGR pressure readings before and after the EGR cooler can be checked with plausibility comparison to the intake manifold pressure and ambient barometric pressure at low speed and low engine torque, comprising operating the engine at the required speed and torque ranges, the throttle is open (no demand for closure, and the EGR PWN % is greater than a calibratable threshold. If the absolute value of the difference between any two pressure signals is greater than a calibratable value for a period of time exceeding the calibratable fault timer and a calibratable number of occurrences and a calibratable number of drive cycles.

46. The method of claim 43, wherein if an engine is operating under high speed and torque conditions, operating the engine at the required speed and torque ranges, the throttle is open, and the EGR PWN % is greater than a calibratable threshold; if the absolute value of the difference between any two pressure signals is greater than a calibratable value for a period of time exceeding the calibratable fault timer and a calibratable number of occurrences and a calibratable number of drive cycles.

47. The method of claim 1, wherein if the engine is operating at high speed and torque, a fault timer calibration considers soak time effect; operating the engine at desired torque and speed ranges; a fault is indicated if the turbocharger compressor outlet temperature is less than a calibratable threshold for a period of time exceeding the calibratable fault timer and a calibratable number of occurrences and a calibratable number of drive cycles.

48. The method of claim 1, wherein if the engine is operating at a desired low speed and torque range, said fault timer calibration considers soak time effect; a fault is indicated it the turbocharger compressor outlet temperature is greater than a calibratable threshold for a period of time exceeding the calibratable fault timer and a calibratable number of occurrences and a calibratable number of drive cycles.

49. The method of claim 1, wherein after the engine has been turned off and the temperatures have been allowed to stabilize for an adequate period of time, the method compares values of the intake manifold temperature, oil and engine coolant, EGR temperatures after the EGR cooler, exhaust temperature before the EGR cooler, and the turbocharger compressor outlet temperature; a fault is indicated if any of the temperatures deviate more than by a calibratable amount from an average of the other temperatures for more than a calibratable period of time, and for a calibratable number of occurrences.

50. The method of claim 49, wherein it is expected that gas temperature readings after adequate soak time depends upon the engine soak time history, said method includes testing plausibility of the temperature difference that is a function of engine off time and of engine coolant temperature, ensuring the Diesel Particulate Filter is not regenerating, the ignition is on and a grid heater is not activated; measuring the temperatures during the period of time between ignition on and engine cranking; determining the average temperature from all gas temperature readings; logging a fault if any one of the temperatures differs from the calculated average by an amount greater than either of the temperature threshold delta values.

51. The method of claim 1, wherein compressor inlet temperature may be compared to the engine coolant for a plausibility check; said method including determining the temperature one the engine coolant has warmed and is not higher than the compressor temperature by more than a threshold value, operating the engine at desired torque and speed, a fault code is recorded if the engine coolant minus the compressor temperature is less than a minimum calibratable delta value for a period of time exceeding the calibratable fault timer and a calibratable number of occurrences and driving.

52. The method of claim 1, further including a rationality check on the EGR flow target error at low flow, said method controlling the EGR valve and turbocharger parameters to increase or decrease EGR mass flow so that the measured EGR mass flow matches the demanded EGR mass flow; said method including operating the engine at the requires speed and torque ranges, determining whether the observed EGR mass flow demand minimum is less that the EGR mass flow demand which is less than the observed EGR massflow demand maximum; a fault code is indicated if the EGR mass flow desired EGR massflow measured is greater than the observed EGR massflow delta maximum at low flow for a period of time exceeding the calibratable fault timer and a calibratable number of occurrences and driving cycles and the EGR valve position PWM % is to be demanded to a calibratable position default and the maximum available torque at present operating speed is reduced to a calibratable percentage of the normally available maximum engine torque.

53. The method of claim 51, further providing for a rationality check on the EGR flow target error at high flow wherein the control system for the EGR adjusted the EGR valve and turbocharger parameters to increase or decrease EGR mass flow so that the measured EGR mass flow matches the demanded EGR mass flow; operating the engine at the required speed and torque ranges, ensuring the observed EGR mass flow demand minimum is greater than the EGR mass flow demand; a fault is indicate if the EGR mass flow, derived EGR massflow, and the measured EGR massflow is greater than the observed FOR massflow delta maximum at high flow for a period of time exceeding the calibratable fault timer and a calibratable number of occurrences and driving cycles, and the EGR valve position PWM % is to be demanded to a calibratable position default and the maximum available torque at present operating speed is reduced to a calibratable percentage of the normally available maximum engine torque.

54. The method of claim 1, wherein braking modes where no EGR flow is demanded and it is desired to identify leakage of the EGR valve to problems not identified by position feedback detection, the method includes enabling engine brakes, and ensuring EGR PWM % is less than observed EGR PWM % leak detect; a fault is indicated if the EGR measured massflow is greater than the observed EGR massflow leakage at maximum braking for a period of time exceeding the calibratable fault timer and a calibratable number of occurrences and driving cycles.

55. The method of claim 1, wherein the engine control system seeks to achieve a desired air mass flow level; the method comprising engine operation to be dominated by the EGR flow being active in order to maintain emissions compliance; adjusting the turbocharger parameters to achieve the desired mass airflow rate by comparing the desired air mass flow rate to that measured or calculated from appropriate algorithms and measured engine operating parameters such as intake manifold temperature and pressure and engine speed; operating the engine at the required speed and torque ranges, and determining that desired air massflow is greater than the observed air massflow demand minimum; a fault is indicated if the desired air massflow minus the actual air massflow is greater than the observed air massflow delta maximum power for a period of time exceeding the calibratable fault timer and the calibratable number of consecutive drive cycles wherein the condition occurs is met.

56. The method of claim 55, wherein the engine control system can also seek to achieve a desired air mass flow level which in braking mode by comparing the desired air mass flow rate to that measured or calculated from appropriate algorithms and measured engine operating parameters such as intake temperature and pressure and engine speed; enabling the engine brakes; a fault is indicated by determining that the desired air mass flow minus the actual air massflow is greater than the observed air massflow delta maximum braking for a period of time exceeding the calibratable fault timer and the calibratable number of consecutive drive cycles wherein the condition occurs is met.

57. The method of claim 1, wherein component functionality is determined by comparing a single values against an expected range.

58. The method of claim 5, wherein said limited levels may be assigned to any diagnostic monitor.

* * * * *